United States Patent [19]
Frank et al.

[11] Patent Number: 5,404,486
[45] Date of Patent: Apr. 4, 1995

[54] PROCESSOR HAVING A STALL CACHE AND ASSOCIATED METHOD FOR PREVENTING INSTRUCTION STREAM STALLS DURING LOAD AND STORE INSTRUCTIONS IN A PIPELINED COMPUTER SYSTEM

[75] Inventors: Edward H. Frank, Protola Valley; Masood Namjoo, Palo Alto, both of Calif.

[73] Assignee: Sun Microsystems, Inc., Mountain View, Calif.

[21] Appl. No.: 88,572

[22] Filed: Jul. 7, 1993

Related U.S. Application Data

[63] Continuation of Ser. No. 917,823, Jul. 21, 1992, abandoned, which is a continuation of Ser. No. 493,898, Mar. 15, 1990, abandoned.

[51] Int. Cl.6 .............. G06F 9/38; G06F 12/00; G06F 13/00
[52] U.S. Cl. .............. 395/425; 364/DIG. 1; 395/375; 395/650
[58] Field of Search .............. 395/375, 425, 650, 550

[56] References Cited

U.S. PATENT DOCUMENTS

| | | | |
|---|---|---|---|
| 4,437,149 | 3/1984 | Pomerene et al. | 395/425 |
| 4,722,050 | 1/1988 | Lee et al. | 395/375 |
| 4,734,852 | 3/1988 | Johnson et al. | 395/250 |
| 4,811,208 | 3/1989 | Myers et al. | 395/800 |
| 4,811,215 | 3/1989 | Smith | 395/375 |
| 4,851,990 | 7/1989 | Johnson et al. | 395/325 |
| 4,872,111 | 10/1989 | Daberkow et al. | 395/250 |
| 4,888,689 | 12/1989 | Taylor et al. | 395/425 |
| 4,894,772 | 1/1990 | Langendorf | 395/375 |
| 4,912,633 | 3/1990 | Schweizer | 395/800 |
| 4,920,477 | 4/1990 | Colwell et al. | 395/425 |
| 4,933,837 | 6/1990 | Friedlin | 395/375 |
| 4,947,316 | 8/1990 | Fisk et al. | 395/325 |
| 5,006,980 | 4/1991 | Sanders et al. | 395/375 |
| 5,027,270 | 6/1991 | Riordan et al. | 395/425 |
| 5,041,968 | 8/1991 | Yamaguchi | 395/725 |
| 5,050,068 | 9/1991 | Dollas et al. | 395/375 |
| 5,136,696 | 8/1992 | Beckwith et al. | 395/375 |

FOREIGN PATENT DOCUMENTS 0227319 7/1987 European Pat. Off. .

OTHER PUBLICATIONS

Hewlett-Packard Journal, vol. 38, No. 9; published Sep. 1987, Palo Alto, Calif., US; pp. 4–17; by Mangelsdorf et al.; Entitled: "A VLSI Processor for HP Precision Architecture".

IBM Technical Disclosure Bulletin, vol. 27, No. 10B; published Mar. 1985, New York US; pp. 6267–6268; Entitled: "Overlapping Instruction Unit Delay With Instruction Prefetching".

IBM Technical Disclosure Bulletin, vol. 27, No. 5; published Oct. 1984; New York US; p. 2764; by Pomerene et al.; entitled: "Reducing AGI In Split Cache Processors".

"RISC Architecture", by Daniel Tabak, Research Studies Press/John Wiley and Sons, 1987, pp. 112–118.

*Primary Examiner*—Glenn Gossage
*Attorney, Agent, or Firm*—Blakely Sokoloff Taylor & Zafman

[57] ABSTRACT

A central processing unit of a computer system which has an arithmetic logic unit, a register file, an instruction decode/fetch instruction data unit, a bus interface, a multiplexer and a stall cache. The stall cache is coupled to the instruction decode/fetch instruction data unit by a data bus and an internal instruction bus, so that the stall cache can receive and store instructions that have been delayed by an external data fetch during a load or store operation. Upon the next data access, the stall cache allows the delayed instruction to be accessed by the internal instruction bus and to then be processed by the central processing unit without the delay of an external data fetch.

7 Claims, 6 Drawing Sheets

PROCESSOR HAVING A STALL CACHE AND ASSOCIATED METHOD FOR PREVENTING INSTRUCTION STREAM STALLS DURING LOAD AND STORE INSTRUCTIONS IN A PIPELINED COMPUTER SYSTEM

This is a continuation of application Ser. No. 07/917,823, filed on Jul. 21, 1992, now abandoned, which is a continuation of application Ser. No. 07/493,898, filed on Mar. 15, 1990, now abandoned.

BACKGROUND OF THE INVENTION

1. Field of the Invention

This invention relates to computer systems and, more particularly, to methods and apparatus for increasing the speed of operation of computer processors capable of providing pipelined operation.

2. Background of the Invention

The development of digital computers progressed through a series of stages beginning with processors that were able to process only a few basic instructions in which the programming needed to be done at a machine language level to processors capable of handling very complicated instructions written in high level languages. At least one of the reasons for this development is that high level languages are easier for programmers to use; and, consequently, more programs are developed more rapidly. Another reason is that more advanced machines executed operations more rapidly.

There came a point, however, where the constant increase in the ability of the computers to run more complicated instructions actually began to slow the operation of the computer over what engineers in the computer field felt was possible with machines operating with only a small number of basic instructions. These engineers began to design advanced machines for running a limited number of instructions, a so-called reduced instruction set, and were able to demonstrate that these machines did, in fact, operate more rapidly for some types of operations. Thus began the reduced instruction set computer which has become known by its acronym, RISC.

The central processing unit of the typical RISC computer is very simple. In general, it fetches an instruction every clock cycle. In its simplest embodiment, all instructions except for load and store instructions act upon internal registers within the central processing unit. A load instruction is used to fetch data from external memory and place it in an internal register, and a store instruction is used to take the contents of an internal register and place it in external memory.

One of the techniques utilized in RISC and other computers for obtaining higher speeds of operation is called pipelining. Processors utilized in computer systems to provide pipelined operations normally cycle through fetch, decode, execute, and write back steps of operation in executing each instruction. In a typical pipelined system, the individual instructions are overlapped so that an instruction executes once each clock cycle of the system. However, when the pipelined RISC computer is performing a load or store operation, a longer time is required because the typical system has only a single data bus that carries both instructions and data to off-chip memory. A load or a store operation requires that both the instruction and the data be moved on the bus. Consequently, at least two cycles are normally required.

This two cycle minimum time has been shortened in the prior art by employing the "Harvard" architecture in which separate buses and memories are used for instructions and data. Using this architecture, the processor can continue executing instructions while a load or a store instruction is being performed since there is a separate path for fetching instructions. However, with single chip integrated circuit implementations of RISC processors, a Harvard architecture requires that either the existing address and data pins to memory operate at twice the rate at which instructions are needed or twice the number of pins must be provided. In either case, twice the off-chip bandwidth is required.

To avoid this significant change in off-chip bandwidth, some RISC chips provide an on-chip instruction cache so that an internal source of instructions is available and both data and instructions need not be on the bus at the same time. However, such an instruction cache usually requires a good deal of chip space and may not be feasible without radical overhaul of the architecture of a chip.

It is, therefore, very desirable that some means for eliminating the time cost of load and store instructions in pipelined systems, especially RISC systems, be provided. Moreover, this same problem may arise in any situation in which a pipelined processor of any sort must deal with an instruction that causes a stall due to a bus contention. For example, an instruction adding memory to a register might cause such a stall. Input/output controllers utilizing processors are often subject to such problems.

SUMMARY OF THE INVENTION

It is, therefore, an object of the present invention to provide a means for eliminating the time cost of load and store instructions in pipelined systems, especially RISC systems.

It is another more specific object of the present invention to provide a means for eliminating the time cost of load and store instructions in pipelined systems, especially RISC systems, which does not require extensive chip architecture modification.

Another object of the invention is to provide a means for eliminating the time cost of instructions which cause a stall due to bus contention in pipelined operations of processors.

These and other objects of the present invention are realized in a computer processor which utilizes a very small on-chip cache for storing only those instructions the access to which is delayed because of a data access on the data bus occurring during a load or a store instruction whereby the instruction is available to the processor upon the next data access during such an instruction without the delay of a bus access.

These and other objects and features of the invention are further explained by the detailed description which follows taken together with the drawings in which like elements are referred to by like designations throughout the several views.

NOTATION AND NOMENCLATURE

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art.

An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing the operations of the present invention include general purpose digital computers or other similar devices. In all cases the distinction between the method operations in operating a computer and the method of computation itself should be borne in mind. The present invention relates to an apparatus and to method steps for operating a computer in processing electrical or other (e.g. mechanical, chemical) physical signals to generate other desired physical signals.

DETAILED DESCRIPTION OF THE INVENTION

Figure 1:
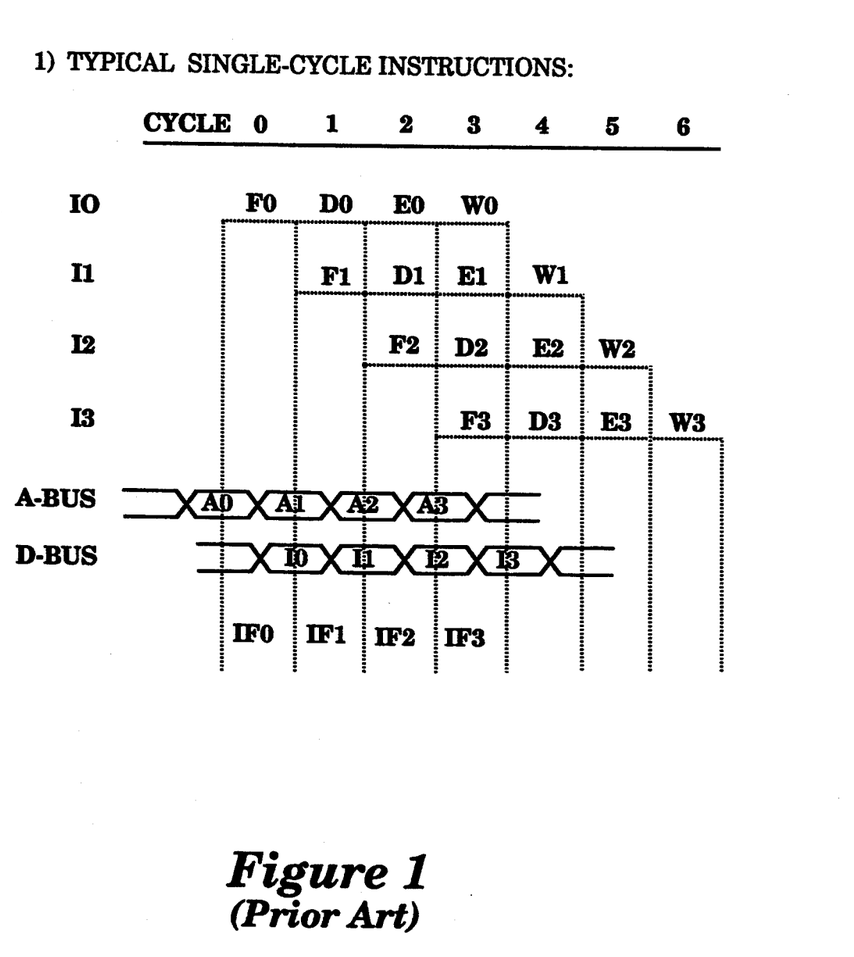
FIG. 1 is a timing diagram illustrating a typical pipelined computer system executing a number of instructions that require a single system clock cycle to execute.

FIG. 1 illustrates a timing diagram showing the operation of a typical pipelined RISC processor while processing single cycle instructions. Single cycle instructions are those that when utilized in the system allow an instruction to be executed during each system clock cycle. The typical steps of executing an instruction are to fetch the instruction, to decode the instruction for its meaning and addresses involved, to execute the instruction, and to write the result of the instruction back to registers of the processor.

FIG. 1 shows a number of clock cycles along the top of the diagram beginning at the clock cycle designated as time 0 and continuing through the clock cycle designated as time 6. Four instructions $I_0$ through $I_3$ are illustrated in the diagram. Each instruction illustrated includes a fetch, a decode, an execute, and a write back stage. The assertion of the addresses of the instructions on the address bus and the assertion of the instructions on the data bus are illustrated below the steps of the instructions.

As may be seen in FIG. 1, the steps of these instructions are overlapped so that after an interval of two clock cycles from the first fetch, one instruction is executing during each clock cycle. Thus at clock time 0, instruction $I_0$ is fetched. At clock time 1, instruction $I_1$ is fetched, and instruction $I_0$ is decoded. At clock time 2, instruction $I_2$ is fetched, instruction $I_1$ is decoded, and instruction $I_0$ is executed. At clock time 3, instruction $I_3$ is fetched, instruction $I_2$ is decoded, instruction $I_1$ is executed, and the results of instruction $I_0$ are written back to registers. This execution of an instruction during each clock cycle continues for so long as the processor does not encounter a load or a store instruction. It will be recognized by those skilled in the art that this is not an as especially long period, for load and store instructions amount to an average of twenty percent of the instructions executed by a RISC.

Figure 2:
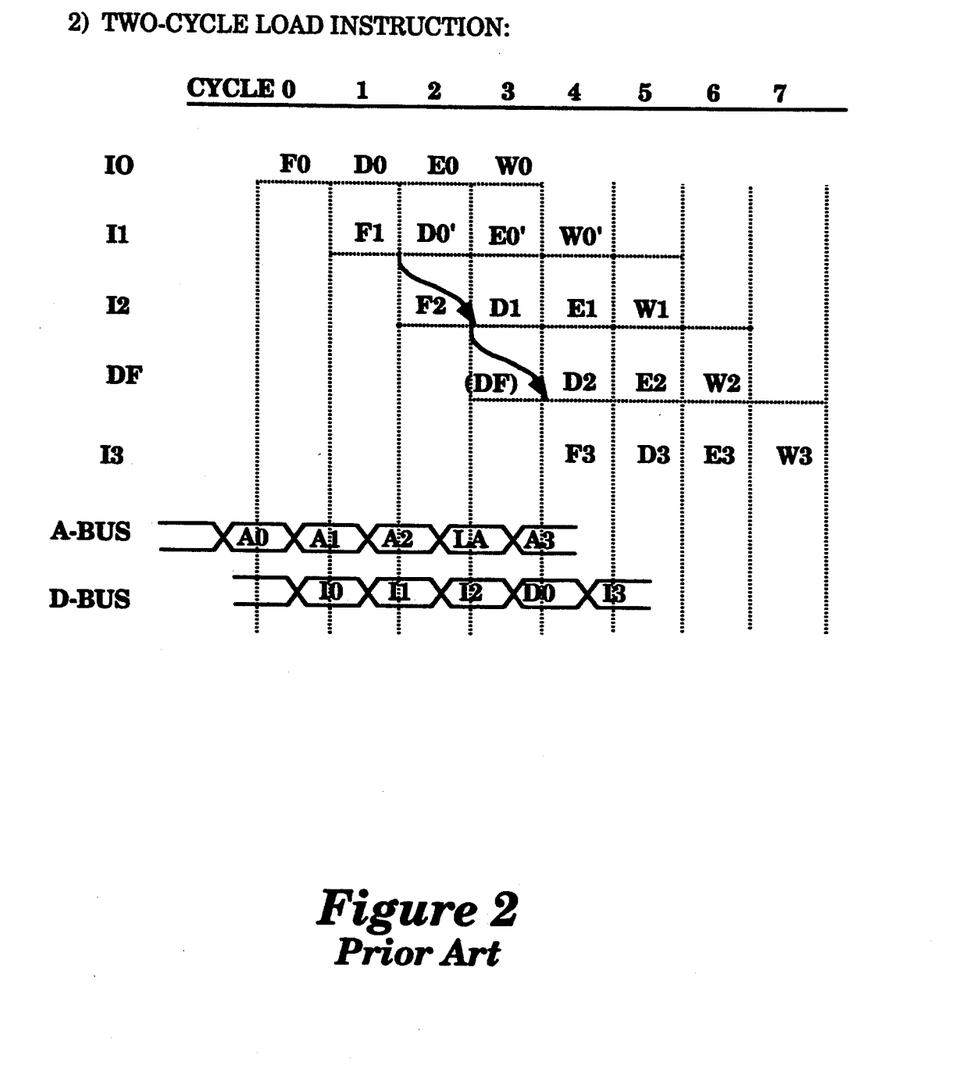
FIG. 2 is a timing diagram illustrating a typical pipelined computer system executing a number of instructions that require a single system clock cycle to execute and one load instruction that requires two system clock cycles to execute.

FIG. 2 illustrates a timing diagram showing the operation of a typical pipelined RISC processor while processing instructions which in addition to single cycle instructions, include a load instruction. As in FIG. 1, a number of system clock cycles are illustrated along the top of the diagram commencing with cycle time 0 and continuing through clock cycle time 7. Four instructions $I_0$ through $I_3$ are illustrated, along with a single data fetch required by the load instruction, which is for this description considered to be instruction $I_0$. As with FIG. 1, the assertion of the addresses of the instructions and the load address on the address bus and the assertion of the instructions and data on the data bus are illustrated below the steps of the instructions.

The decoding of the instruction $I_0$ at time 1 requires that the processor fetch data from memory during clock cycle time 3. The address from which the data is to be loaded is provided on the address bus during cycle time 2, and the data to be loaded is placed on the data bus during cycle time 3. Since both data and an instruction cannot be on the data bus at the same time, the system is required to stall the pipeline for one cycle while the data is placed on the data bus in the data fetch step shown as DF in FIG. 2. Once the data has been fetched and placed in the pipeline, the next instruction may be fetched. However, the execution of instructions has been delayed by one clock cycle so that instruction $I_3$ is not complete until cycle time 7.

Figure 6:
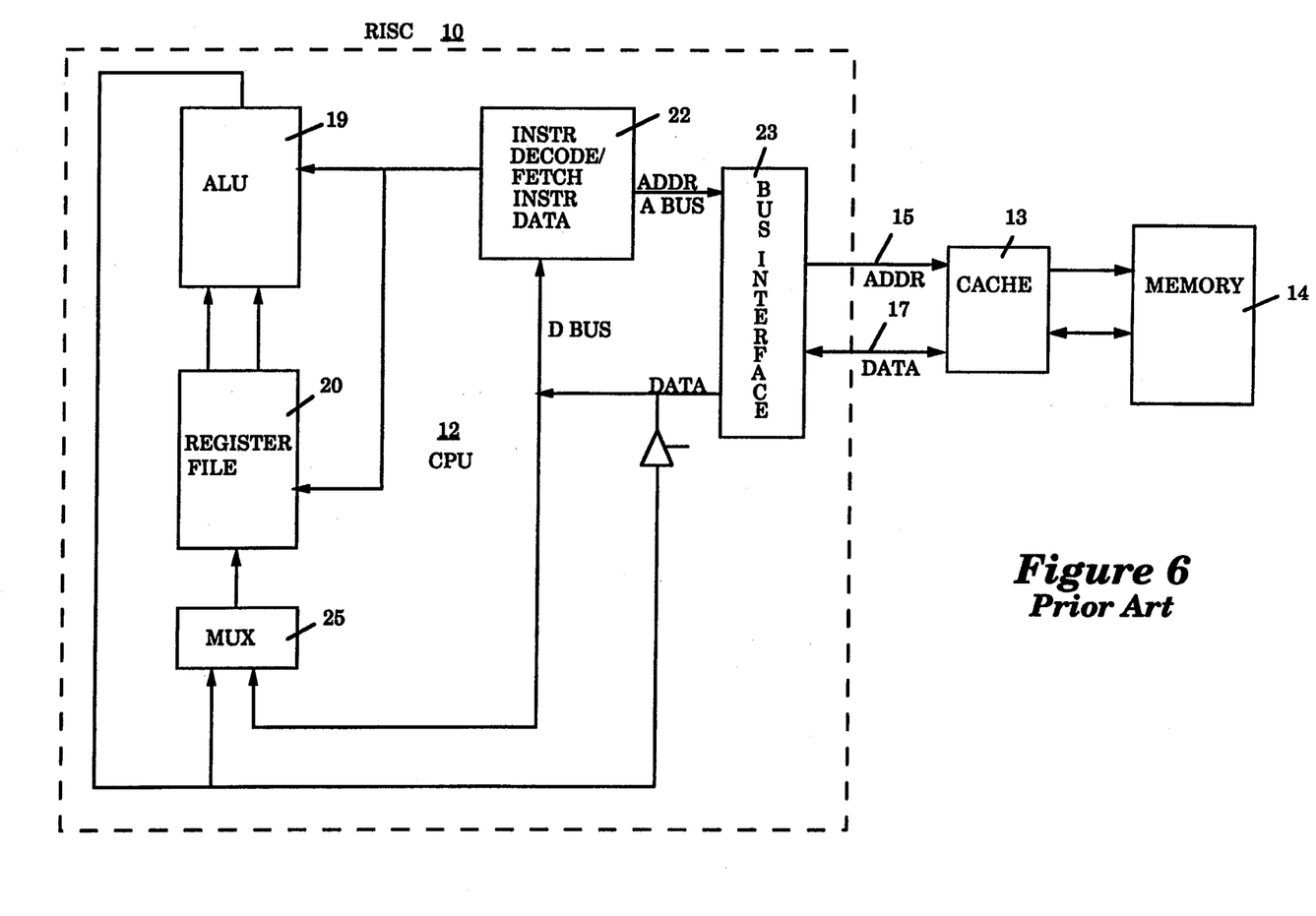
FIG. 6 is a block diagram illustrating a typical RISC system of the prior art.

The reason for this delay is illustrated in the block diagram of FIG. 6. The computer illustrated therein is a RISC 10 having a central processing unit 12 and external memory 14 coupled to the central processing unit 12 by a data bus 17 and an address bus 15 from a cache memory 13. The central processing unit 12 includes an arithmetic logic unit 19, a register file 20, an instruction decode/fetch instruction data unit 22, and a bus interface 23.

In operation, addresses are transferred between the memory 14 and the central processing unit 12 on the address bus 15 while both data and instructions are transferred between the unit 12 and the memory 14 on the data bus 17. Instructions appear on the data bus 17 and are transferred to the instruction decode unit 22 while data appearing on the data bus 17 are transferred by a multiplexor 25 to the register file 20. Since instructions must use the same bus 17 as does the data, when an instruction requires the access of data from the memory 14, as do load and store instructions, only one of these operations can use the bus at once. Thus, it is apparent that the delay of the processing in the pipeline is due to the structure of the processor which provides only a single bus for both data and instructions.

Figure 3:
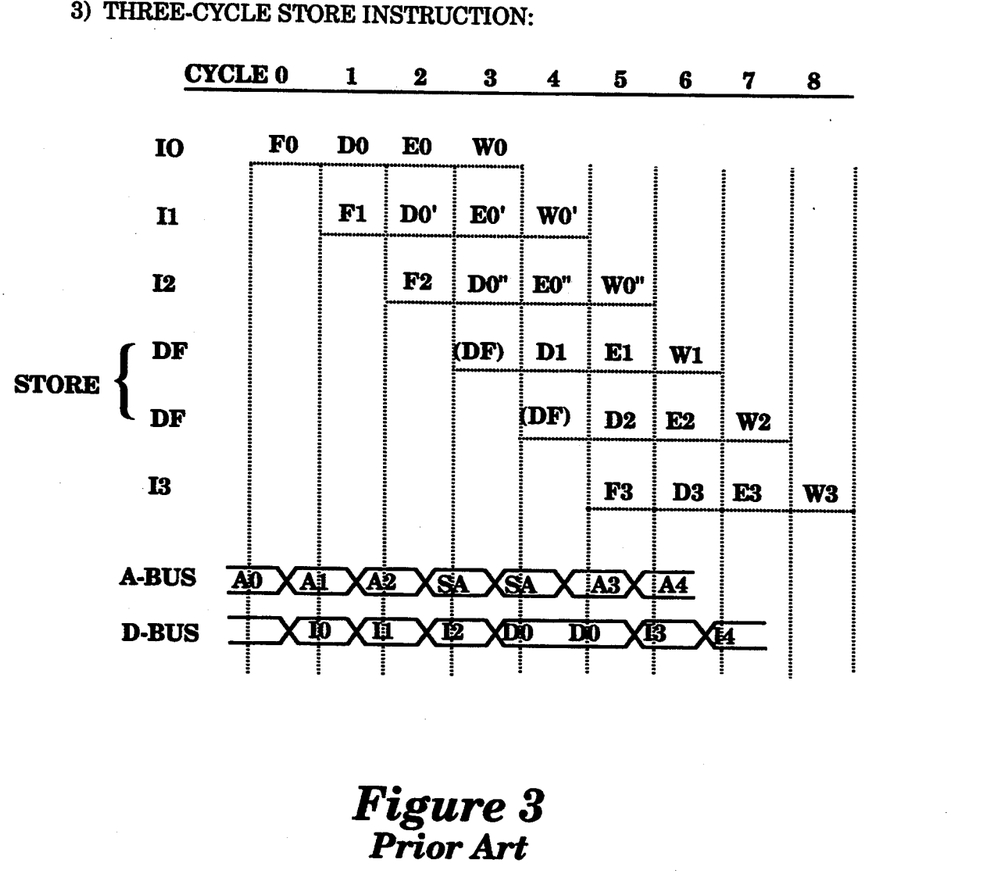
FIG. 3 is a timing diagram illustrating a typical pipelined computer system executing a number of instructions that require a single system clock cycle to execute and one store instruction that requires three system clock cycles to execute.

FIG. 3 illustrates a timing diagram showing the operation of a typical pipelined RISC processor while processing instructions which in addition to single cycle instructions include a store instruction. The computer may, for example, be one of the SPARC based computers manufactured by Sun Microsystems, Mountain View, Calif. Such computers normally require two clock cycles to transfer data during a store operation It is not, however, necessary either to the understanding of this invention or to its implementation that the system require two bus cycles for a store operation. As in FIGS. 1 and 2, a number of system clock cycles are illustrated along the top of the diagram commencing with clock cycle time 0 and continuing through clock cycle time 8. Four instructions $I_0$ through $I_3$ are illustrated along with a pair of data fetch cycles required by the store instruction which is for this description considered to be instruction $I_0$. The assertion of the addresses of the instructions and the store addresses on the address bus and the assertion of the instructions and data on the data bus are illustrated below the steps of the instructions.

The decoding of the instruction $I_0$ at time 1 provides the store addresses which require that the processor transfer data to memory during two different cycles. Since both data and instructions cannot be on the data bus at the same time, the system is required to stall the pipeline for two clock cycles while the data is placed on the data bus in the data fetch steps shown as DF in FIG. 3. Once the data has been fetched and placed in the pipeline, the next instruction may be fetched. However, the execution of instructions has been delayed by two clock cycles so that instruction $I_3$ is not complete until clock cycle time 8.

As pointed out above, the two cycle minimum time has been shortened in the prior art by providing an on-chip general purpose instruction cache so that an internal source of instructions is available and both data and instructions need not be on the bus at the same time. However, such an instruction cache usually requires a good deal of chip space and may not be feasible without radical overhaul of the architecture of the chip, a procedure which may be very expensive. The time has also been shortened by providing both an instruction and a data bus for the system so that instructions and data may be transferred in parallel. This also requires a good deal of chip architecture revision and significant expense.

The present invention overcomes this problem of the prior art in a different manner. The present invention provides a very small on-chip restricted-use cache that may be termed a stall cache for the purposes of this disclosure. This stall cache may have only a very few lines. For example, in a preferred embodiment, the stall cache may be a fully-associative cache having a line size of one instruction so that no unnecessary instructions need be stored in the cache. A cache of this type having eight lines would require a very small amount of die space on the chip. Consequently, it might be placed on presently designed chips without requiring any substantial architecture modification. The cache might also be implemented in other forms having a larger line size and therefore storing more than load and store instructions. An N-way set associative cache might also be utilized.

The stall cache of this invention is somewhat like a branch target cache which is also a restricted type of cache. However, a branch target cache is utilized to hold instructions that are the targets of branches while the present invention utilizes a restricted cache to hold instructions involved in bus contentions.

The cache is arranged to hold instructions just as in a full sized instruction cache except that the stall instructions held are only those instructions that would have been accessed on the data bus during a period in which a load or a store operation (or a similar operation in any pipelined system whether a RISC or a CISC (Complex Instruction Set Computer) having instructions which cause a stall due to bus contention) occupies the pipeline so that the instruction cannot be accessed in the typical one instruction per clock cycle.

The processor of the present invention is arranged so that the instruction may be accessed in the on-chip stall cache at the same instant that the data is being fetched on the data bus, essentially in parallel. Consequently, when the information is in the stall cache, no time is lost due to the load and store instruction delays. It has been found that the significant speed increases are attained simply by using such a cache because most programs are filled with a series of small looping processes which miss on a first loop but fill the cache so that on successive loops no delay is incurred in load and store operations and cache speeds are attained.

Figure 7:
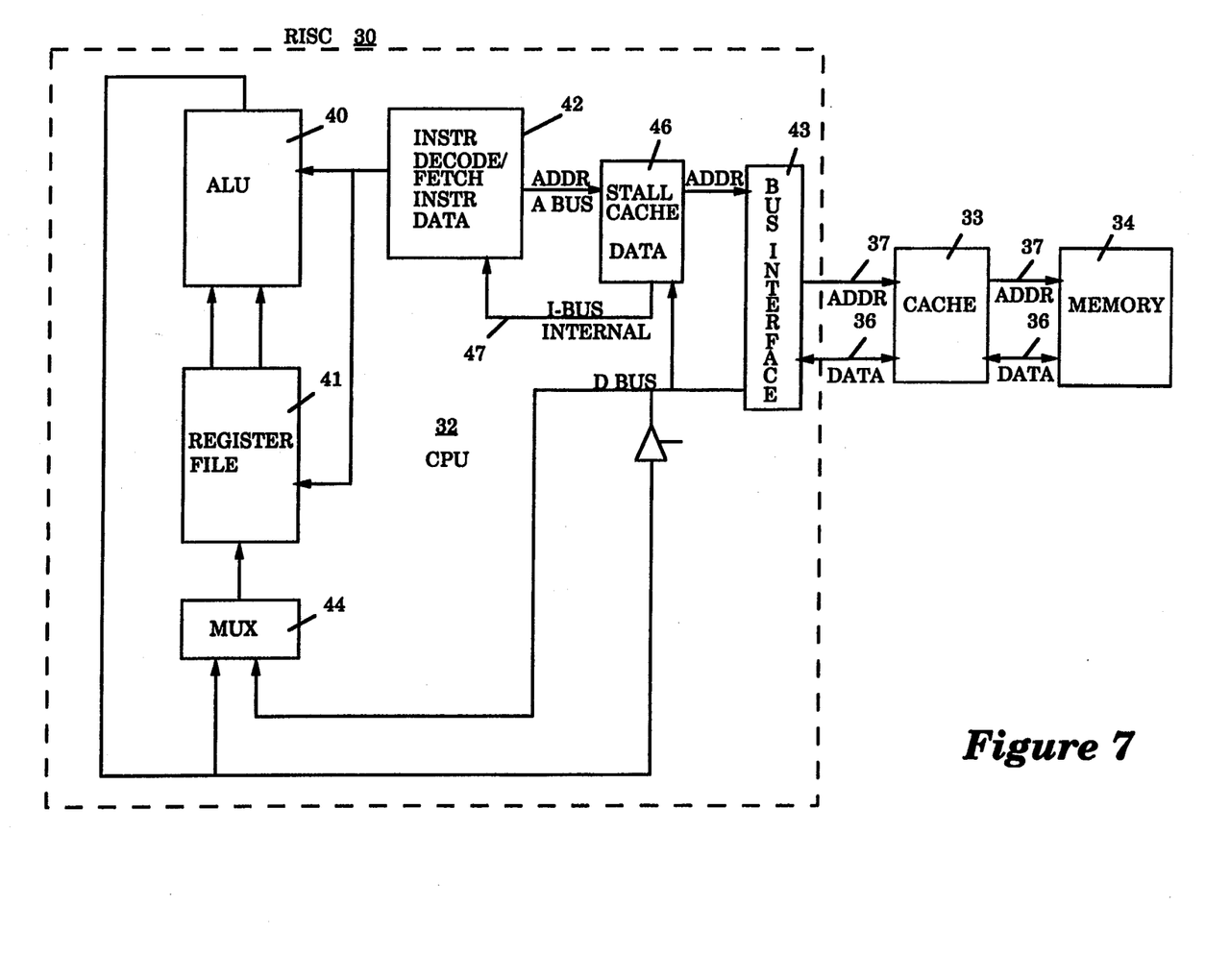
FIG. 7 is a block diagram illustrating a RISC system designed in accordance with the present invention.

FIG. 7 is a block diagram illustrating a RISC system 30 designed in accordance with the present invention. The system 30 includes a central processing unit 32, an external cache 33, and memory 34. The three units are coupled together by a data bus 36 and an address bus 37. The central processing unit 32 includes an arithmetic logic unit 40, a register file 41, an instruction decode/fetch instruction data unit 42, a bus interface 43, and a multiplexer (MUX) 44 just as does the prior art processor illustrated in FIG. 6.

In addition, the central processing unit 32 includes a stall cache 46 arranged to receive and store those instructions which are delayed due to a fetch of data during a load or store operation. As may be seen in FIG. 7, the stall cache 46 is connected to the instruction decode/fetch instruction data unit 42 by the address bus and by an internal instruction bus 47 which provides a path for the transfer of instructions from the cache 46 during the period in which data is being transferred over the external data bus 36. Thus data may be provided to the register file by the data bus 36 via the multiplexor 44 while an instruction is accessed from the stall cache 46.

The manner in which this may be accomplished is relatively simple. When a load or a store instruction is encountered, a bit may be set for example in the instruction decode/fetch instruction data unit 42, to indicate that the instruction that follows the data access is to be stored in the stall cache 46. For example, in a particular SPARC-based RISC system, the instruction that follows the load instruction is the instruction three cycles immediately after a data fetch for an instruction. The instruction which has been stalled or delayed by the access of data is placed in the stall cache 46. For a store instruction, on the other hand, this is the instruction accessed four cycles immediately after two data fetch cycles have been completed. Thereafter, at the next access of the stall cache 46, the instruction will be present so that an external fetch need not occur; and the instruction may be accessed over the internal instruction bus simultaneously with the access of the data on the external data bus 36. Note that in the example shown, in which a store takes three cycles, two instructions will be stored in the stall cache. In general, the stall cache will contain instructions that would have been fetched during a bus stall. There may be one, two, or more instructions for each instruction that caused a stall.

Another method of accomplishing the load of the instruction to the stall cache 46 is to evaluate of a data fetch instruction from the unit 42 and load the next instruction to appear to the stall cache 46.

Figure 4:
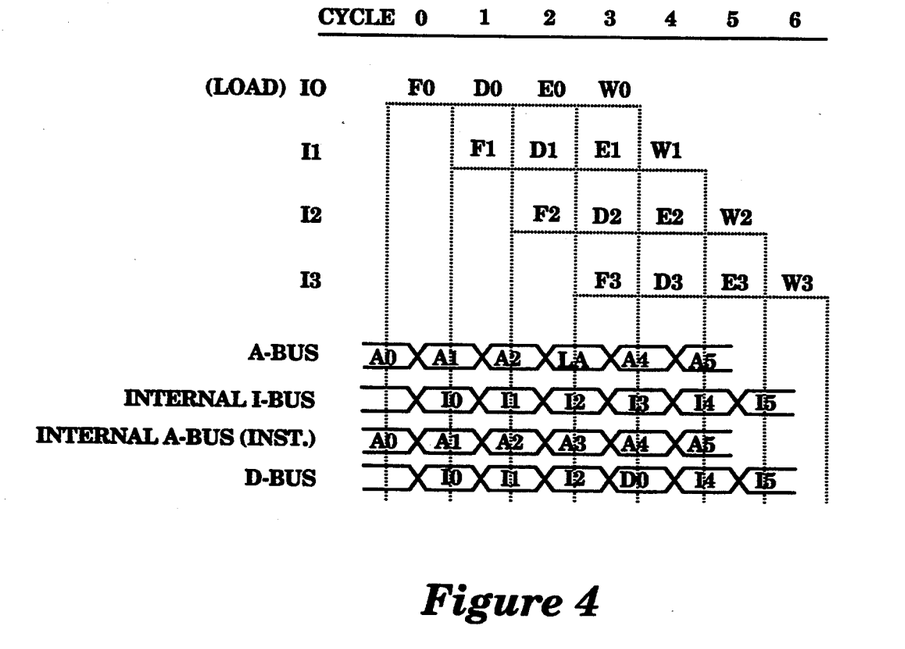
FIG. 4 is a timing diagram illustrating a pipelined computer system in accordance with the invention executing instructions requiring one system clock cycle, and executing a load instruction requiring more than one system clock cycle.

FIG. 4 illustrates a timing diagram showing the operation of a pipelined RISC processor designed in accordance with the invention while processing instructions which, in addition to single cycle instructions, include a load instruction. As in the other timing diagrams, a number of system clock cycles are illustrated along the top of the diagram commencing with cycle time 0 and continuing through clock cycle time 6. Four instructions $I_0$ through $I_3$ are illustrated. The assertion of the addresses of the instructions and the load address on the address bus and the assertion of the instructions and data on the data bus are illustrated below the steps of the instructions.

Although a single data fetch is required by the load instruction, which is for this description considered to be instruction $I_0$, no additional processor time is required. As may be seen, the address of the load instruction and the necessary data are placed on the data bus and the internal address bus. Then the data and the instruction are fetched simultaneously using the external data bus 36 and the internal instruction bus. Consequently, no delay of the pipeline due to a stall condition is incurred.

Figure 5:
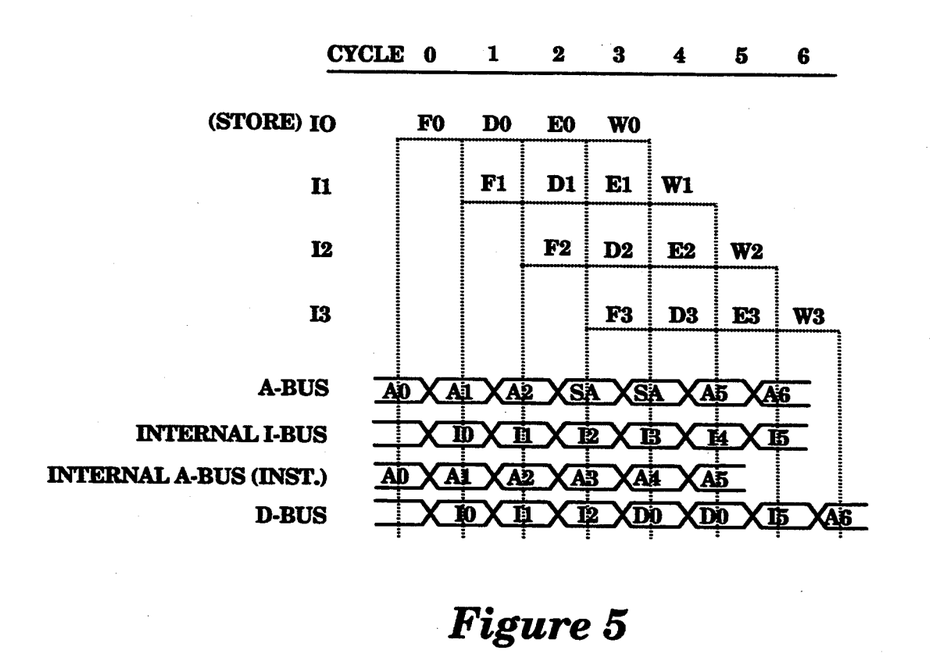
FIG. 5 is a timing diagram illustrating a pipelined computer system constructed in accordance with the invention executing instructions requiring one system clock cycle, and executing a store instruction requiring more than one system clock cycle.

FIG. 5 is a timing diagram illustrating the operation of the central processing unit 32 in handling a store operation. Again it may be seen that no delay is incurred due to a stall condition, and the pipeline continues to execute instructions once every clock cycle.

Although two data fetch cycles are required by the store instruction which is for this description considered to be instruction $I_0$, no additional processor time is required. As may be seen, the addresses of the store instruction and the data necessary are placed on the data bus and the internal address bus. Then the data and the instruction are fetched simultaneously using the external data bus 36 and the internal instruction bus. Consequently, no delay of the pipeline due to a stall condition is incurred.

It has been found that the significant delay in such machines is caused not by the speed of operation of an external cache, but by the delays caused by the load and store operations. Consequently, the stall cache of this invention provides a significant speed increase over the prior art arrangements without significant architecture changes.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. A processor, comprising:
    an instruction decode and fetch circuit (IDF) coupled to fetch an instruction stream from an external memory and having circuitry for executing the instruction stream, the IDF fetching the instruction stream by transferring a series of instruction addresses over an address bus and receiving the instruction stream over an internal bus, the IDF executing a data transfer instruction in the instruction stream by transferring a data transfer address over the address bus and transferring a data value over a data bus;
    cache means receiving the instruction addresses over the address bus and transferring the instruction addresses over an external address bus to the external memory, the cache means receiving the instruction stream from the external memory over the data bus and transferring the instruction stream to the IDF over the internal bus, the cache means storing an instruction from the instruction stream only if the instruction follows the data transfer instruction of the instruction stream, the cache means transferring the instruction that follows the data transfer instruction to the IDF over the internal bus after the IDF executes the data transfer instruction.

2. The processor of claim 1 wherein the data transfer instruction is a load instruction, such that the cache means transfers the instruction that follows the data transfer instruction to the IDF over the internal bus while the IDF transfers the data value over the data bus to the external memory.

3. The processor of claim 1 wherein the data transfer instruction is a store instruction, such that the cache means transfers the instruction that follows the data transfer instruction to the IDF over the internal bus while the IDF receives the data value over the data bus from the external memory.

4. The processor of claim 1 wherein the cache means comprises a fully-associative cache having a line size of one instruction.

5. A method for executing an instruction stream for a processor, comprising the steps of:
    fetching the instruction stream by transferring a series of instruction addresses over an address bus to an external memory, and receiving the instruction stream over an internal bus from the external memory;
    executing a data transfer instruction in the instruction stream by transferring a data transfer address over the address bus to the external memory and transferring a data value over a data bus coupled to the external memory;
    storing an instruction from the instruction stream in a cache only if the instruction follows the data transfer instruction, and executing the instruction that follows the data transfer instruction of the instruction stream after executing the data transfer instruction.

6. The method of claim 5 wherein the data transfer instruction is a load instruction, and wherein the step of executing a data transfer instruction comprises the step of transferring the data value over the data bus to the external memory.

7. The method of claim 5 wherein the data transfer instruction is a store instruction, and wherein the step of executing a data transfer instruction comprises the step of receiving the data value over the data bus from the external memory.

* * * * *